119,084

UNITED STATES PATENT OFFICE.

HENRY V. P. DRAPER, OF HANNIBAL, ASSIGNOR TO HIMSELF, FRANK HOLTZ-CLAW, JOHN W. HICKMAN, ANDREW B. HOPKINS, AND SAMUEL S. BOYD, OF ST. LOUIS, MISSOURI.

IMPROVEMENT IN MATERIALS FOR THE MANUFACTURE OF PAPER-PULP.

Specification forming part of Letters Patent No. 119,084, dated September 19, 1871.

*To all whom it may concern:*

Be it known that I, HENRY V. P. DRAPER, of Hannibal, Marion county, State of Missouri, have discovered and produced a new and useful Material for the Manufacture of Paper-Pulp, of which the following is a full, clear, and exact description:

It is well known that any article, in order to be a substitute for rags in the manufacture of paper, should combine the qualities of cheapness, strength, toughness, and elasticity, and be free from the defects of brittleness and hardness common to most of the substitutes now in use. In order to overcome these defects it has been found necessary to mix these substitutes with a greater or less percentage of rags or other articles more or less costly, thus enhancing materially the first cost of the pulp. I have discovered a material not only free from the defects inherent in wood, straw, and other substances now used, but which experiment has proved to me will produce, without admixture with other materials, a pulp from which strong, elastic, and tough paper, free from brittleness or hardness, and of various degrees of fineness, can be produced. To my knowledge the plant referred to has never hitherto been put to any practical use, but from the luxuriance of its growth has come to be regarded as a pest by the farmer. Among botanists it is known as the *Abutilon avicennæ*, though like most plants it has various local names, as "rag-weed," "stamp-weed," &c., and grows in great profusion in Missouri, Illinois, and other States. The plant requires no preliminary sorting or like preparation before being cut up preparatory to the reducing process. The whole of the plant above the root is first cut into small pieces and placed in any suitable vessel and boiled, say from one hour and a half to two hours, in a strong alkali made from water and wood ashes, to which, if a small quantity of unslaked lime be added, the reduction will be more rapid. The pith of the plant will be washed away by the liquid, while the remainder of the plant will be converted into a dingy-colored pulp. This pulp may then be bleached either by simple solution of chlorine or by chloride of lime, the latter being preferable on account of being less expensive. The process above described will produce the pulp; but in practice it will be better, when it is to be manufactured on a large scale, to submit the plant to the well-known process of reducing straw and the like by means of alkalies and steam pressure, as I have proved by experiment that this plant, when put through such process, is quickly converted into pulp. The pulp of course is made into paper in the ordinary way, it requiring no peculiar treatment.

Not only will this material, without admixture with other substances, produce a most excellent paper-pulp, but it may also be used with other materials as a substitute for rags and other expensive materials now used with wood and straw pulp in order to produce a good quality of paper.

I of course do not claim therein any originality in the process described, nor do I wish to limit myself to the use of any particular one of the known processes of obtaining pulp from straw or woody fibers, but merely to claim as my invention and secure by Letters Patent—

1. As a new article of manufacture, a pulp suitable for the manufacture of paper, obtained from the plant *Abutilon avicennæ*, whether used alone or in combination with other fibrous substances in the manufacture of paper, substantially as described.

2. The use of the plant *Abutilon avicennæ* in the manufacture of paper, whether the same is used alone or in combination with other materials, substantially as set forth.

H. V. P. DRAPER.

Witnesses:
SAML. S. BOYD,
FRANK HOLTZCLAW.

(81.)